(12) United States Patent
Kraemer

(10) Patent No.: US 10,191,174 B2
(45) Date of Patent: Jan. 29, 2019

(54) SYSTEM AND METHOD FOR DEEP DETECTION OF PETROLEUM AND HYDROCARBON DEPOSITS

(71) Applicant: Longbranch Enterprises Inc., Lakewood, WA (US)

(72) Inventor: Ervin Kraemer, Lakewood, WA (US)

(73) Assignee: LONGBRANCH ENTERPRISES INC., Lakewood, WA (US)

( * ) Notice: Subject to any disclaimer, the term of this patent is extended or adjusted under 35 U.S.C. 154(b) by 0 days.

(21) Appl. No.: 15/875,498

(22) Filed: Jan. 19, 2018

(65) Prior Publication Data

US 2018/0143340 A1 May 24, 2018

Related U.S. Application Data

(63) Continuation of application No. 14/145,667, filed on Dec. 31, 2013, now Pat. No. 9,910,177.

(51) Int. Cl.
| | | |
|---|---|---|
| *G01V 1/52* | (2006.01) | |
| *G01V 1/04* | (2006.01) | |
| *G01V 11/00* | (2006.01) | |
| *G01V 1/104* | (2006.01) | |

(52) U.S. Cl.
CPC ............... *G01V 1/52* (2013.01); *G01V 1/04* (2013.01); *G01V 11/007* (2013.01); *G01V 1/104* (2013.01)

(58) Field of Classification Search
CPC ................................ G01V 1/02; G01N 29/34
See application file for complete search history.

(56) References Cited

U.S. PATENT DOCUMENTS

| | | | | | |
|---|---|---|---|---|---|
| 2,054,067 | A | * | 9/1936 | Blau | G01V 3/265 324/323 |
| 2,312,642 | A | * | 3/1943 | Herzenberg | G01V 1/245 333/2 |
| 2,679,205 | A | * | 5/1954 | Piety | G01V 1/06 181/116 |
| 2,846,661 | A | * | 8/1958 | Cunningham | G01V 13/00 346/33 C |

(Continued)

FOREIGN PATENT DOCUMENTS

| | | |
|---|---|---|
| WO | 2003003055 A2 | 1/2003 |
| WO | 2004097459 A1 | 11/2004 |

(Continued)

OTHER PUBLICATIONS http://www.aqualocate.com
http://www.findwellwater.com/

*Primary Examiner* — Isam A Alsomiri
*Assistant Examiner* — Amie M Ndure
(74) *Attorney, Agent, or Firm* — Davis Wright Tremaine LLP

(57) ABSTRACT

A system and method for deep detection of petroleum and hydrocarbon deposits is disclosed. The system includes a sensing array that includes a plurality of electrodes positioned in the ground at a testing site, a sensing device, and a system for generating a seismic event that generates below-ground signals that are received by the sensing array. The system enables detection and depth determination of underground features such as petroleum and hydrocarbon deposits at greater depths compared to conventional systems.

19 Claims, 12 Drawing Sheets

(56) References Cited

U.S. PATENT DOCUMENTS

| | | | | |
|---|---|---|---|---|
| 4,519,053 A * | 5/1985 | Bedenbender | | G01V 1/04 |
| | | | | 181/119 |
| 5,402,392 A * | 3/1995 | Lu | | G01V 1/46 |
| | | | | 166/254.2 |
| 5,574,218 A * | 11/1996 | Withers | | E21B 43/26 |
| | | | | 367/37 |
| 5,903,153 A | 5/1999 | Clarke et al. | | |
| 6,225,806 B1 | 5/2001 | Millar et al. | | |
| 6,452,395 B1 | 9/2002 | Clarke et al. | | |
| 6,476,608 B1 | 11/2002 | Dong | | |
| 6,597,633 B1 | 7/2003 | Millar et al. | | |
| 6,842,697 B1 | 1/2005 | Millar et al. | | |
| 7,529,152 B2 * | 5/2009 | Sinha | | G01V 1/50 |
| | | | | 367/25 |
| 8,031,555 B2 * | 10/2011 | Schuster | | G01V 1/001 |
| | | | | 181/108 |
| 8,436,609 B2 | 5/2013 | Srnka et al. | | |
| 8,499,679 B1 * | 8/2013 | Crowell | | F41A 23/36 |
| | | | | 181/114 |
| 2003/0125878 A1 * | 7/2003 | Bakulin | | G01V 1/30 |
| | | | | 702/14 |
| 2003/0205428 A1 * | 11/2003 | Chang | | G01V 1/143 |
| | | | | 181/108 |
| 2006/0256655 A1 * | 11/2006 | Sinha | | G01V 1/50 |
| | | | | 367/31 |
| 2007/0003780 A1 * | 1/2007 | Varkey | | H01B 7/2806 |
| | | | | 428/586 |
| 2007/0283635 A1 * | 12/2007 | Lee | | E04H 9/022 |
| | | | | 52/167.7 |
| 2009/0207693 A1 * | 8/2009 | Schuster | | G01V 1/001 |
| | | | | 367/38 |
| 2011/0141846 A1 * | 6/2011 | Uhl | | G01V 1/008 |
| | | | | 367/35 |
| 2011/0310701 A1 * | 12/2011 | Schuster | | G01V 1/22 |
| | | | | 367/38 |

FOREIGN PATENT DOCUMENTS

| | | |
|---|---|---|
| WO | 2009045670 A1 | 4/2009 |
| WO | 2012052770 A2 | 4/2012 |

\* cited by examiner

SYSTEM AND METHOD FOR DEEP DETECTION OF PETROLEUM AND HYDROCARBON DEPOSITS

CROSS-REFERENCE TO RELATED APPLICATIONS

This application is a continuation of U.S. application Ser. No. 14/145,667 filed Dec. 31, 2013, now U.S. Pat. No. 9,910,177, which application is hereby incorporated herein by reference in its entirety and for all purposes.

BACKGROUND

Exploring for and determining the presence and size of petroleum and other hydrocarbon deposits is conventionally expensive and time consuming. Locations where such deposits are suspected to exist are first identified and a drilling rig probes each suspected site. Such drilling is expensive, time consuming and the identification rate of viable deposits is extremely low.

Minimally invasive systems and methods for detecting petroleum and other hydrocarbon deposits are therefore desirable because such systems and methods may provide for substantially less expensive and faster exploration for energy resources. A greater number of candidate sites can be tested with substantially less cost than conventional drilling tests. Moreover, testing can occur at sites that may otherwise be inaccessible by bulky and cumbersome drilling equipment.

Such minimally invasive systems are known in the art for detecting underground features, but are deficient for a variety of reasons. For example, many of these systems to not provide accurate and reproducible data. Although many minimally invasive systems provide results that appear to show the location of underground features, these results are difficult to interpret and such interpretations are highly subjective. Accordingly, the results from many minimally invasive tests are speculative, error prone, and have an unacceptably high rate of false positives and false negatives.

Additionally, systems presently known in the art only provide satisfactory results at shallow depths, which make them useless for detecting below ground features that are below this depth range. This may be suitable for shallow water well detection, but given that the vast majority of petroleum and other hydrocarbon deposits are located at depths that are far below the operative depth of presently known minimally invasive testing systems, such systems that are presently known in the art are not a suitable solution for energy exploration.

For example, U.S. Pat. No. 5,903,153 to Clarke et al. teaches an apparatus and method for detecting underground liquids (known as electrokinetic, electroseismic and more recently seismoelectric sensing) in which electrical potential generated by a seismic shock is detected and measured with respect to a base point insulated from the earth. The disclosed electrokinetic (seismoelectric) system teaches remote sensing of water and other below-ground features. However, as depicted in FIG. 4, the Clarke system only has a maximum depth sensitivity less than 80 meters. In practice, commercial products using the Clarke system, and other minimally invasive sensing systems fail to have an operative depth range that exceeds the 80 meter maximum taught in the Clarke patent.

The Clarke system (and other systems like it) are not operable to detect below-ground features for many reasons. For example, such systems operate by ground level detection of signals generated by underground features. Because such signals become increasing attenuated as they travel upward from an underground source, detection of such signals originating from a deep source are typically masked by environmental and system noise. Accordingly, because these systems generate a signal-to-noise ratio that makes it impossible to discern deep-source signals, they do not operate with a gain that would allow them to detect weak deep-source signals, and do not record signals over a time period when deep-source signals would be received.

In view of the foregoing, a need exists for an improved seismoelectric ground feature sensing system and method for deep detection of petroleum and hydrocarbon deposits, in an effort to overcome the aforementioned obstacles and deficiencies of conventional ground feature sensing systems.

BRIEF DESCRIPTION OF THE DRAWINGS

FIG. 6b is an exemplary side view of a partially disassembled charge probe in accordance with the embodiment depicted in FIG. 6a.

Figure 1:
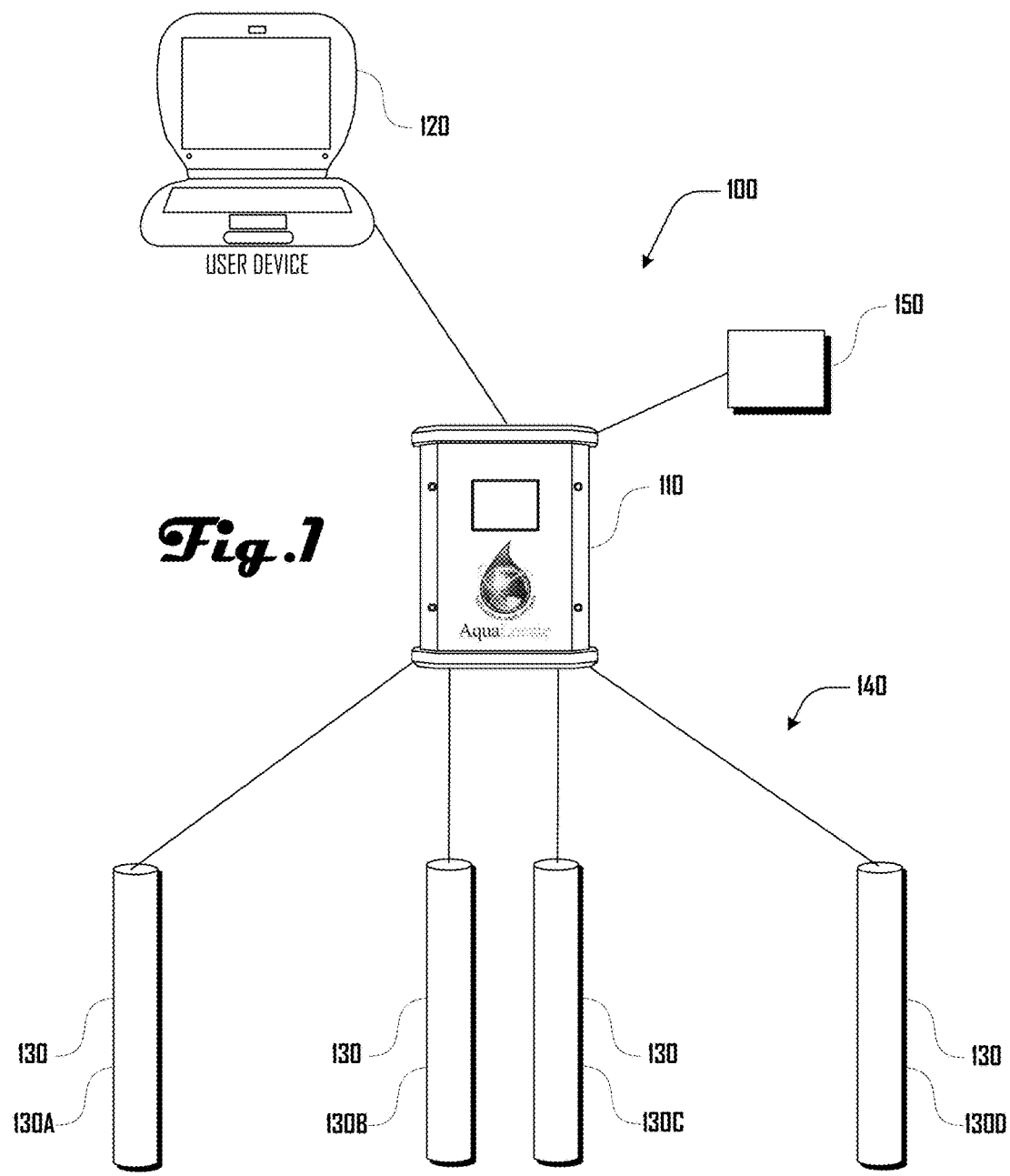
FIG. 1 is an exemplary network drawing illustrating an embodiment of a deep-detection system.

It should be noted that the figures are not drawn to scale and that elements of similar structures or functions are generally represented by like reference numerals for illustrative purposes throughout the figures. It also should be noted that the figures are only intended to facilitate the description of the preferred embodiments. The figures do not illustrate every aspect of the described embodiments and do not limit the scope of the present disclosure.

DETAILED DESCRIPTION OF THE PREFERRED EMBODIMENTS

Since currently available ground feature sensing systems are deficient because they fail to provide for deep detection of petroleum and hydrocarbon deposits, a system and method for deep detection of petroleum and hydrocarbon deposits can prove desirable and provide a basis for fast, inexpensive and accurate energy exploration. This result can be achieved, according to one embodiment disclosed herein, by a deep sensing system 100 as illustrated in FIG. 1.

Turning to FIG. 1, the deep detection system 100 is shown in a network diagram in accordance with an embodiment. The system 100 comprises a sensing device 110 that is operably connected to a user device 120; to a plurality of electrodes 130 that define a sensing array 140; and to a timing trigger 150.

In various embodiments, the user device 120, plurality of electrodes 130, and timing trigger 150 may include a wired or wireless connection to the sensing device 110. For example, a wired connection may include any suitable wire, cable or the like. A wireless connection may include a direct wireless connection or a connection via a wireless network. Such a wireless connection may comprise Wi-Fi, blue-tooth, a near-field connection, or the like. In an embodiment where a portion of the system 100 is interconnected via a network, such a network may comprise a local area network (LAN), the Internet, or the like. Additionally, while one connection configuration is depicted in the embodiments of FIG. 1, in further embodiments, components of the system 100 may interconnected in any suitable configuration. For example, the sensing array 140 may be connected directly to the user device 120. In further embodiments, any of the components of the system 100 may absent, present in a suitable plurality or may be combined with other components of the system 100. For example, in some embodiments, the sensing device 110 may be absent or combined with the user device 120. Additionally, in further embodiments, there may more or fewer than four electrodes (130A, 130B, 130C, 130D) as shown in FIG. 1.

In various embodiments, the sensing device 110 may be any device operable for receiving signals obtained by the electrodes 130 of the sensing array 140, and obtaining a signal from the timing trigger 150. For example, in some embodiments, the sensing device 130 may comprise a device, system or portion thereof as disclosed in U.S. Pat. No. 5,903,153 to Clarke et al, which is hereby incorporated herein by reference in its entirety.

Although the user device 120 is depicted as being a laptop computer in FIG. 1, in further embodiments, the user device 120 may be any suitable device, including a smart-phone, heads-up display, tablet computer, gaming device, or the like.

In a preferred embodiment, the electrodes 130 may comprise elongated copper clad steel rods that are 1 meter long; however, in some embodiments, electrodes 130 of any suitable material, length and diameter may be used, and the electrodes 130 of the sensing array 140 may not be the same. Additionally in further embodiments, electrodes need not be elongated rods as depicted in FIG. 1, and electrodes 130 or sensors of any suitable type may be used in some embodiments.

Figure 2:
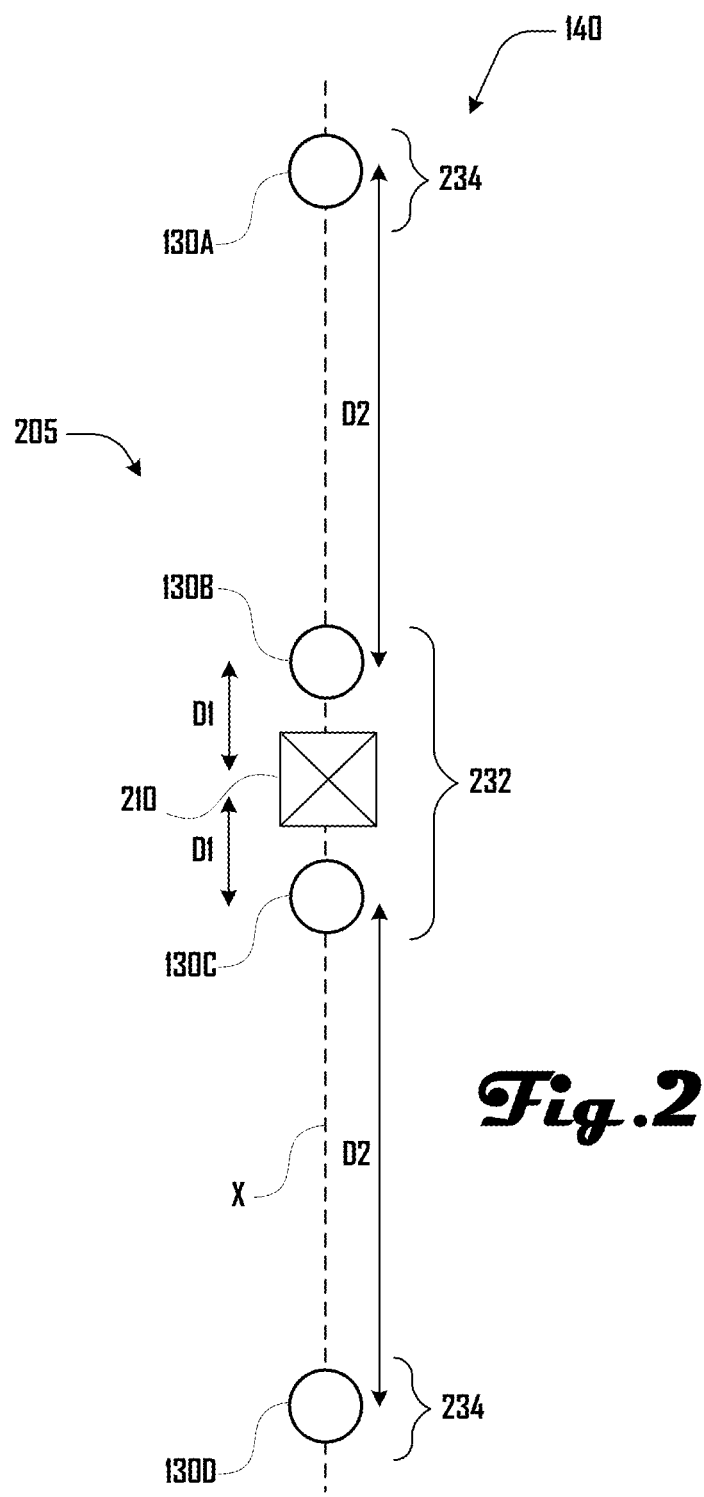
FIG. 2 is an exemplary top view drawing illustrating a sensing array positioned in the ground in accordance with an embodiment.

FIG. 2 is an exemplary top view drawing illustrating an embodiment of a sensing array 140 positioned in the ground 205 in accordance with an embodiment. The sensing array 140 comprises a first, second, third and fourth electrode 130A, 130B, 130C, 130D that are aligned along an array axis X and symmetrically disposed about the seismic event location 210. For example, the second and third electrodes 130B, 130C are disposed substantially equidistant from the event location 210 at a first distance D1 and define a first electrode pair 232. The first and fourth electrodes 130A, 130D are disposed substantially equidistant from the event location 210 at a second distance D2 and define a second electrode pair 234.

In some embodiments, as depicted in FIG. 2, it may be desirable for D1 to be substantially smaller than D2; however, in various embodiments, D1 and D2 may be any desirable distance. For example, D1 may equal D2; D1 may be longer than D2; or D1 may be shorter than D2.

Figure 3A:
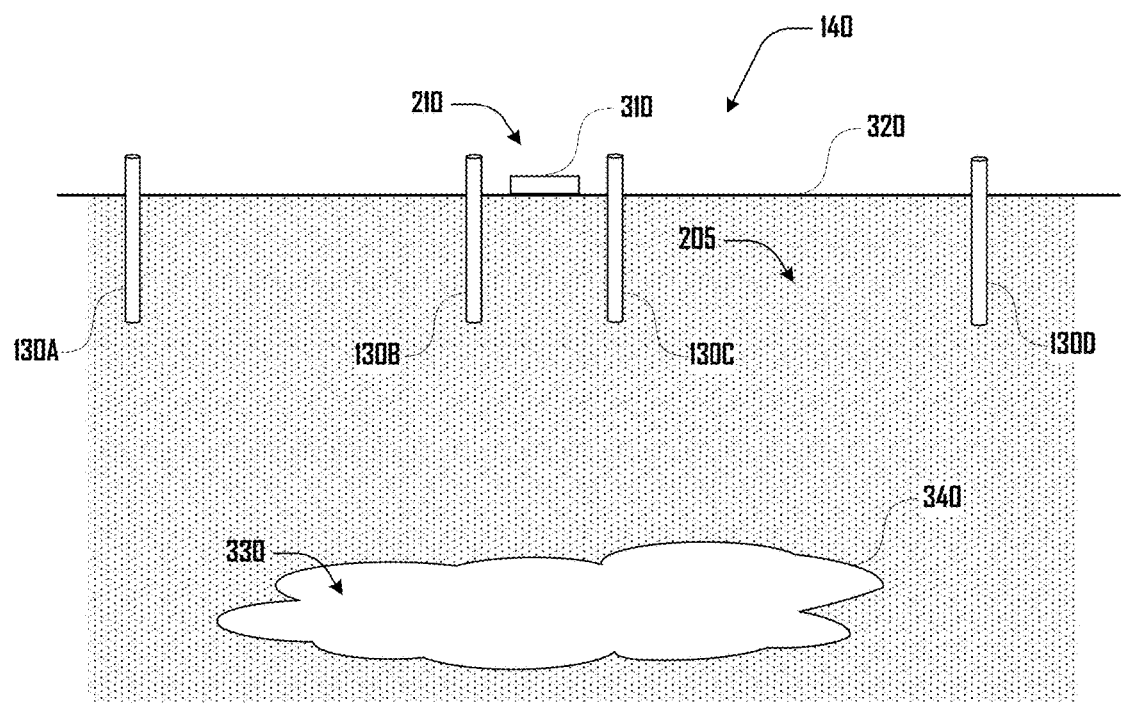
FIG. 3a is an exemplary cross sectional view drawing illustrating an embodiment of a sensing array and seismic event generating plate.
Figure 3B:
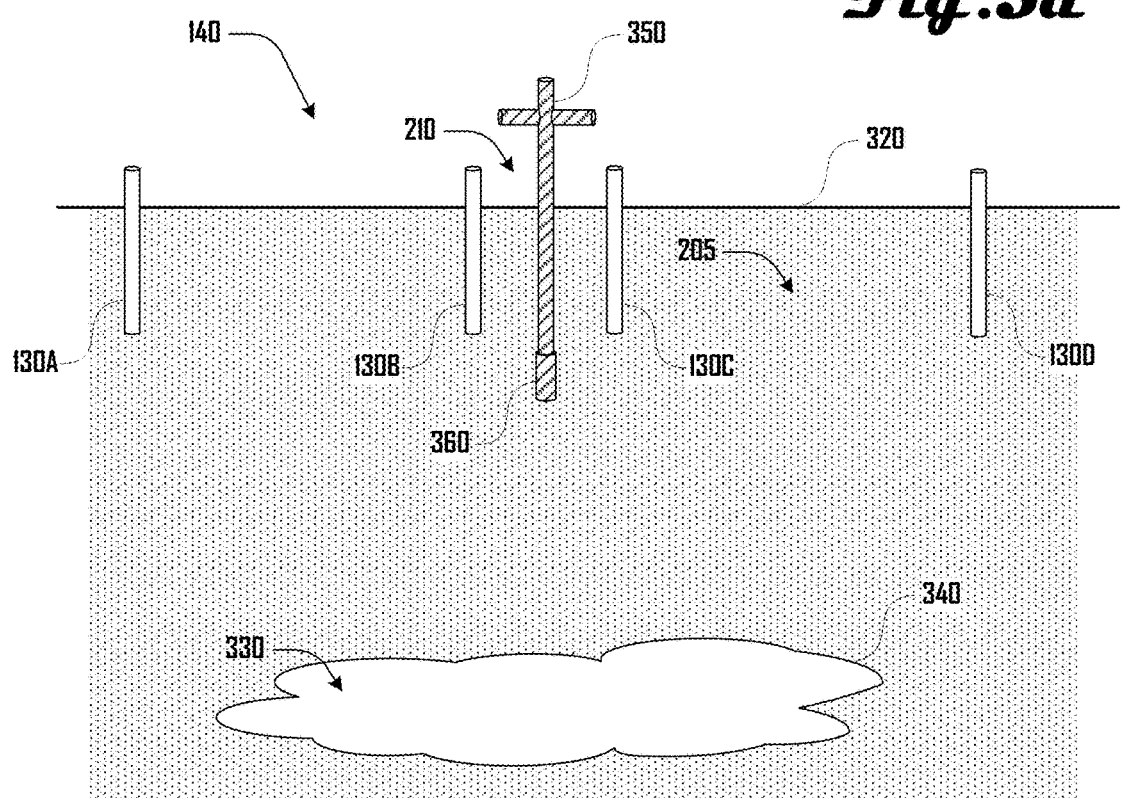
FIG. 3b is an exemplary cross sectional view drawing illustrating an embodiment of a sensing array and seismic event generating probe.

FIGS. 3a and 3b are exemplary cross sectional view drawings illustrating embodiments of a sensing array 140 that respectively depict a seismic event generating plate 310 and seismic event generating probe 350. As shown in FIGS. 3a and 3b, a sensing array 140 is defined by first, second, third and fourth electrodes 330A, 330B, 330C, 330D that are disposed in the ground 205 that includes a top surface 320. The electrodes 330 may each include a portion that is disposed in the ground 205 below the top surface 320 and a portion that extends above the top surface 320. In various embodiments, the electrodes 130 of the sensing array 140 may be disposed in the ground with any suitable length of the electrodes 130 disposed in the ground 205. In some embodiments, as further disclosed herein, it may be desirable for the electrodes 130 to be the same length and be disposed within the ground 205 at the same depth.

Figure 4:
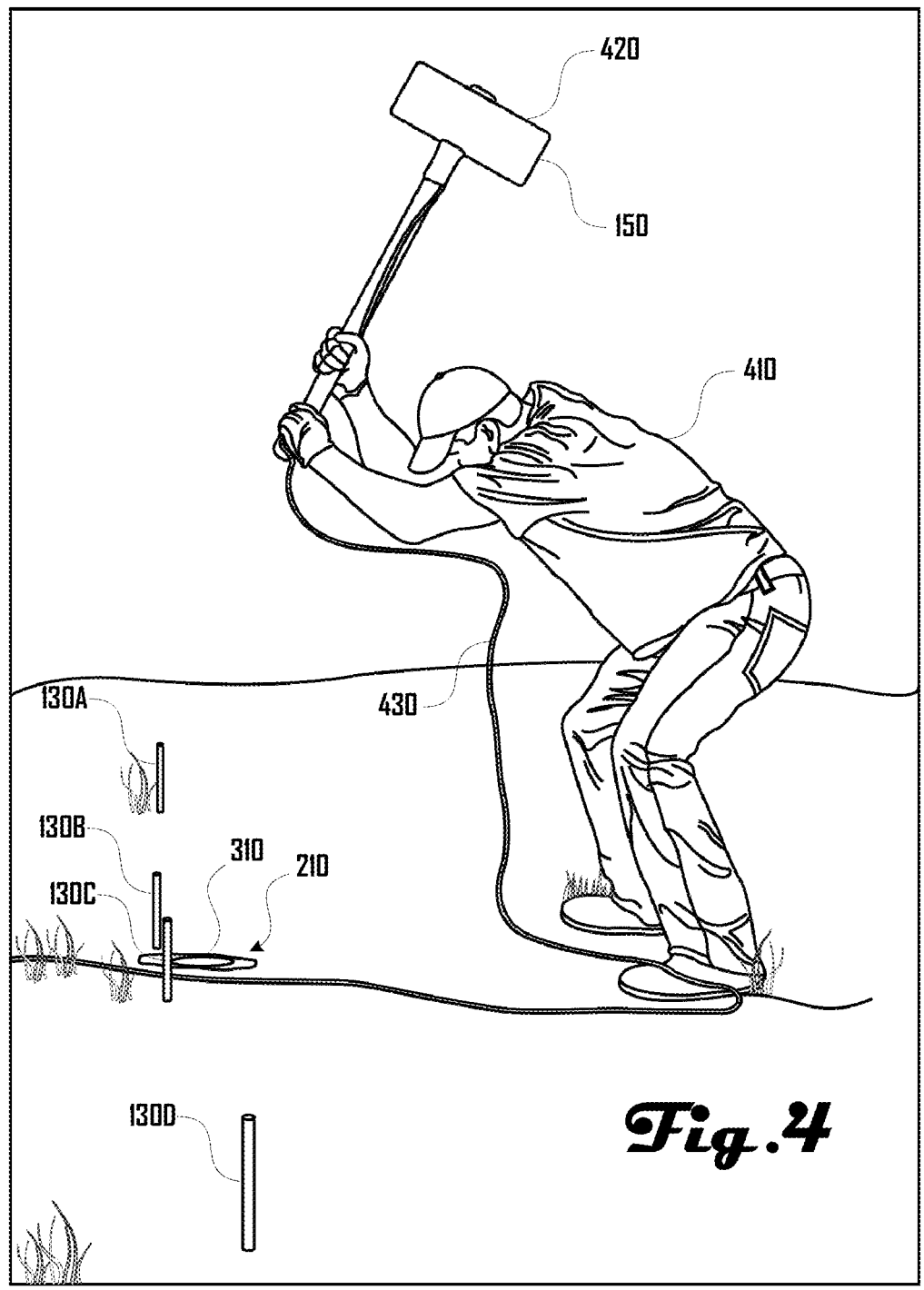
FIG. 4 is an exemplary perspective view drawing illustrating an embodiment of a sensing array and a user generating a seismic event with a plate and mallet.

As shown in FIGS. 3a and 4, a seismic event generating plate 310 may be disposed at a seismic event location 210 among the electrodes 130. The plate 310 may be disposed on the top surface 320 of the ground 205 as shown in FIG. 3a; however, in further embodiments, it may be desirable to position the plate 310 below the surface 320 of the ground 205. For example, as shown in FIG. 4, the seismic event location 210 may be defined by a shallow hole where the plate 310 may be disposed. This may be desirable because removal of topsoil may allow for the plate 310 to rest of flat compact ground 205, which may provide for an improved seismic event in some embodiments.

A user 410 may generate a seismic event at the event location 210 by striking a mallet 420 against the plate 310. Recording and time association of signals received by the sensing array 140 may be triggered by a timing trigger 150 disposed on the mallet 420 that is configured to trigger recording and or timing when the mallet 420 strikes the plate 310. A trigger signal may be sent to the sensing device 110 via a trigger wire 430. As discussed in further detail herein, the timing trigger 150 may provide an indication of when a seismic event occurs and such an indication may be used to correlate recorded data obtained by the sensing array 140 with a time relative to the occurrence of the seismic event. Such a correlation may be used to determine the depth of desirable features 330 in the ground 205.

The mallet 420 and plate 310 may be any suitable size or shape in various embodiments, and may comprise any suitable material in various embodiments. However, as discussed in further detail herein, it may be desirable to conduct sensing with the sensing array 140 without metal-to-metal contact. Accordingly, the plate 310 and head of the mallet 420 may comprise non-metal materials in various embodiments. For example, in some preferred embodiments, the mallet 420 or plate 310 may comprise rubber, plastic, wood, ceramic, glass, a textile, or the like.

While a mallet 420 and plate 310 may be used to generate a seismic event as shown in FIGS. 3a and 4, in further embodiments, any suitable method, device or system may be used to mechanically generate a seismic event. For example, in some embodiments, a hammer, weight-drop, piston device, or the like may be used to generate a seismic event with or without a plate 310, or the like.

Figure 5:
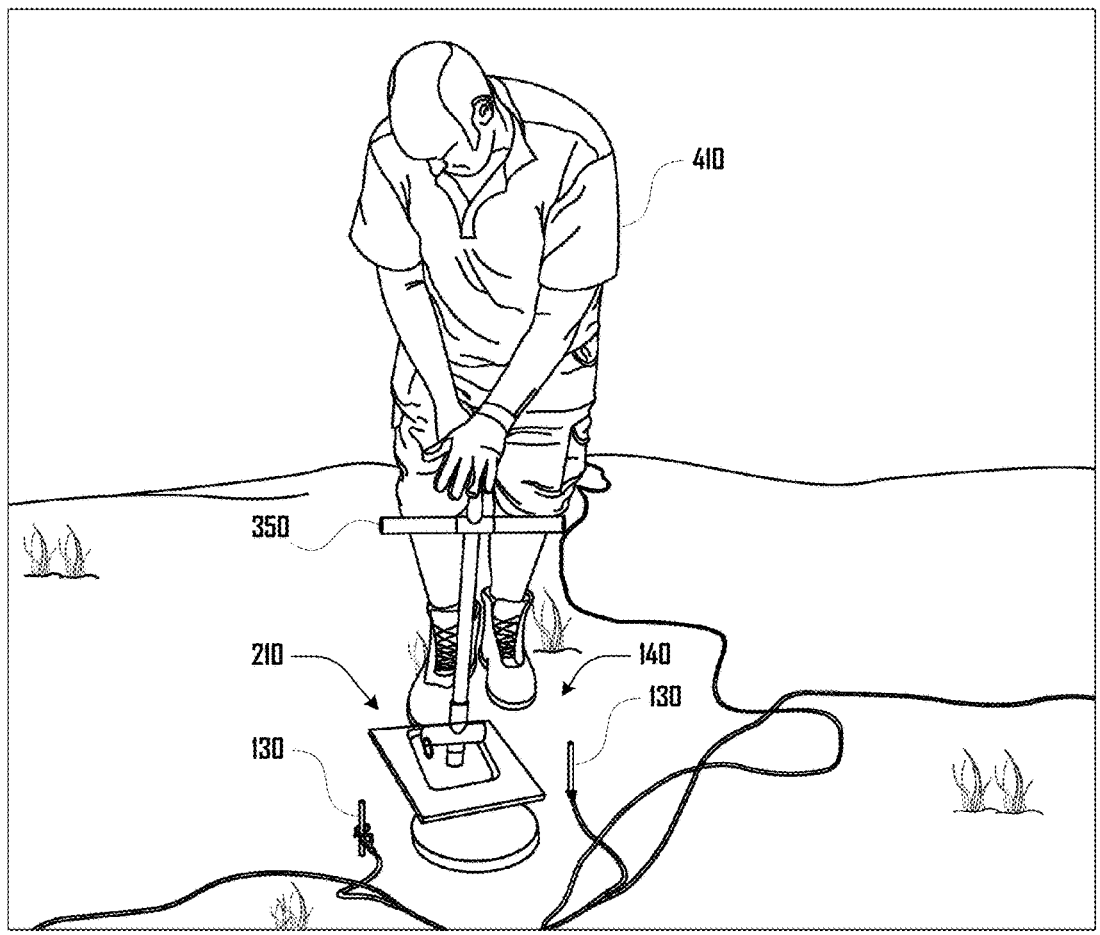
FIG. 5 is an exemplary perspective view drawing illustrating an embodiment of a sensing array and a user generating a seismic event with a charge probe.

In further embodiments, a seismic event may be generated with a charge probe 350 as depicted in FIGS. 3b and 5. The charge probe may be disposed in the ground 205 with a portion that remains extending above the top surface 320 of the ground 205. In various embodiments, the charge probe 350 may be any suitable length and may extend into the ground 205 any suitable length. The charge probe 350 may comprise a charge tip 360 at a bottom end that is configured to deliver an explosive charge that generates a seismic event in the ground 205. In a preferred embodiment as discussed in more detail herein, the charge tip 360 may discharge a black powder charge; however, in further embodiments, any suitable explosive may be used, which may include trinitrotoluene (TNT), nitrocellulose, nitroamine research department explosive (RDX), pentaerythritol tetranitrate (PETN), nitro amine high melting explosive (HMX), dynamite, ammonium nitrate and fuel oil (ANFO), hydrogen, propane, methane, butane, a compressed gas, or the like.

Figure 6A:
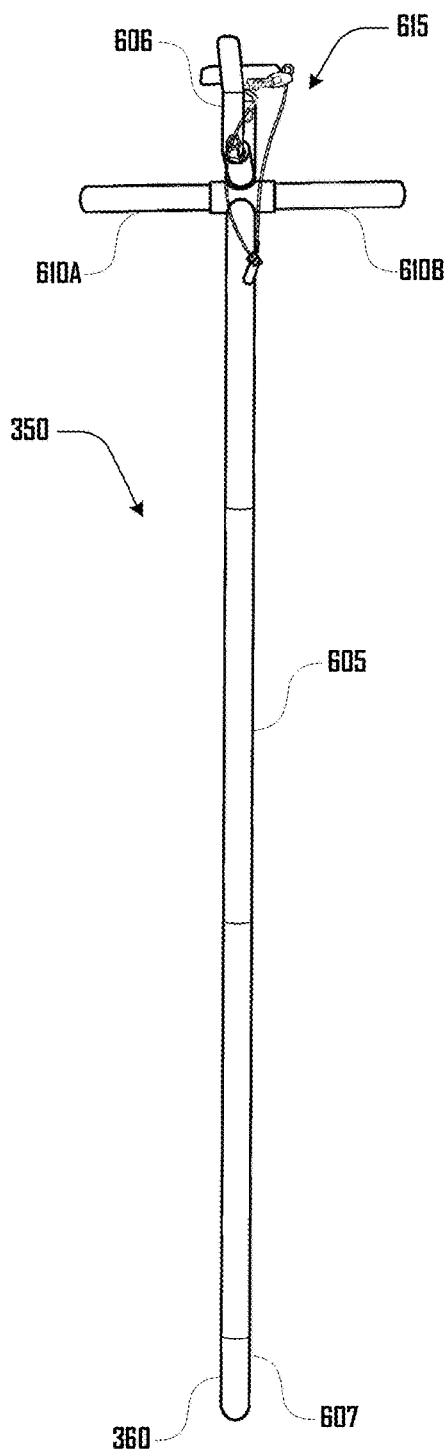
FIG. 6a is an exemplary side view of an assembled charge probe in accordance with an embodiment.
Figure 6B:
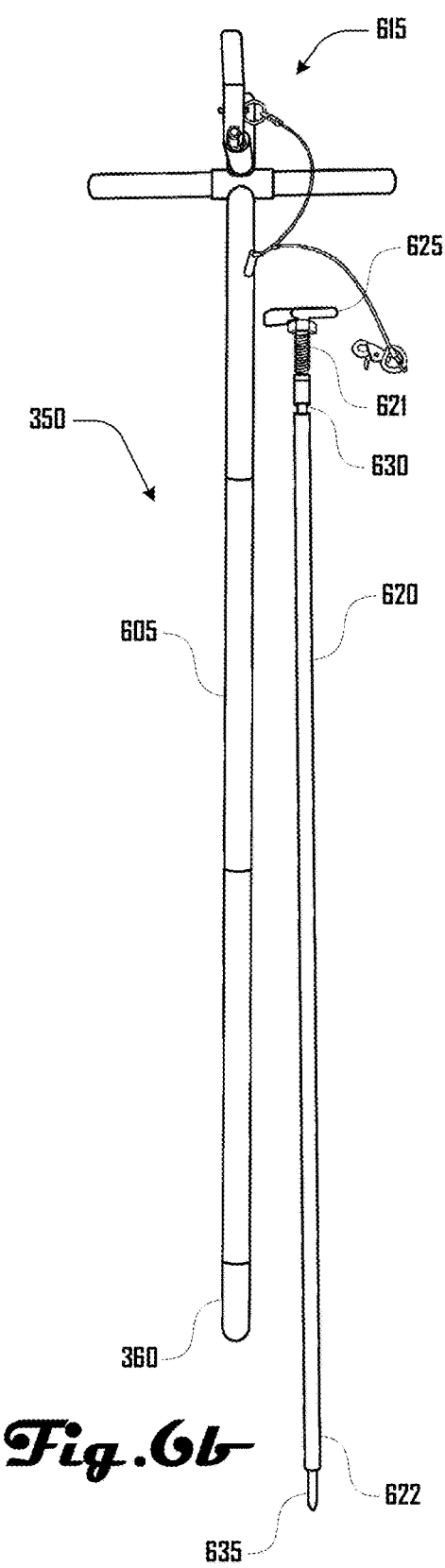

FIG. 6a is an exemplary side view of an assembled charge probe 350 in accordance with an embodiment. The charge probe 350 comprises a probe body 605 having a top and bottom end 606, 607. A first and second handle 610A, 610B are disposed at the top end 606 along with a trigger assembly 615. The charge tip 360 is disposed at the bottom end 607. The charge probe 350 includes a firing shaft 620 that slidably resides within the probe body 605. As shown FIG. 6b, the elongated firing shaft 620 comprises a top and bottom end 621, 622, with a hammer 625 and trigger slot 630 at the top end 621 and a firing pin 635 at the bottom end 622.

Figure 7:
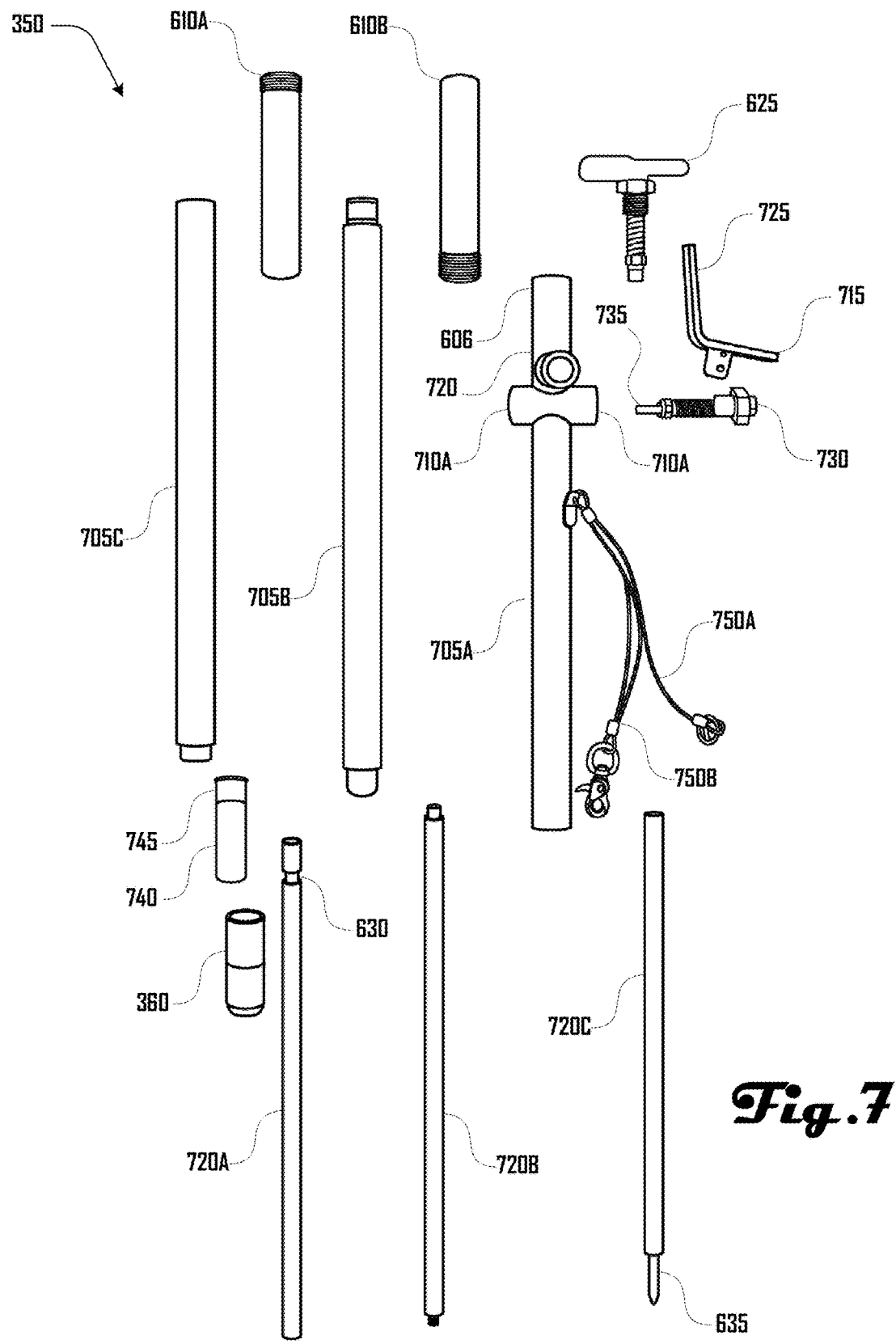
FIG. 7 is an exemplary side view of a further disassembled charge probe in accordance with the embodiment depicted in FIGS. 6a and 6b.

As depicted in FIG. 7, the charge probe 350 may be collapsible and modular, which may be desirable for transportation and shipping of the charge probe 350. The charge probe 350 may be disassembled into a plurality of pieces to reduce the length and width of the charge probe 350. For example, in the embodiment depicted in FIG. 7, the handles 610A, 610B may be removable from the probe body 605, and the probe body 605 may be broken down into first, second and third probe body segments 705A, 705B, 705C. The firing shaft 620 may also be broken down into first, second and third shaft sections 720A, 720B, 720C. Although FIG. 7 depicts the charge probe 350 operable to be broken down into thirds along its length, in various embodiments, the charge probe 350 may be configured to be broken down into any suitable way.

As discussed herein, the charge probe 350 may be used to generate an explosive seismic event. For example, the trigger assembly 615 may be configured to drive the firing pin 635 at the bottom end 622 of the firing shaft 620 into the primer (not shown) in the head 745 of a cartridge 740 disposed in the charge tip 360, which triggers an explosive charge in the cartridge 740.

In the embodiment depicted in FIG. 7, the trigger assembly 615 comprises a trigger 715 having a trigger arm 725. The trigger 715 movably resides in a trigger orifice 720 at the top end 606 of the probe body 605, and a trigger bolt 730 extends through the trigger 715 and into the trigger orifice 720, where a trigger tip 735 at an end of the trigger bolt 730 is configured to engage with the firing shaft 620 at the firing shaft top end 621. The trigger bolt 730 may be inwardly biased toward the firing shaft 620, with the trigger 715 operable to pull the trigger bolt 730 outward.

The firing shaft 620 may be biased toward the bottom end 607 of the probe body 605, which allows the charge probe 350 to be cocked by pulling the firing shaft 620 upward within the probe body 605. The firing shaft 620 may be pulled upward within the probe body 605 by pulling on the hammer 625, or by rocking the hammer 625, which may be rotatably coupled to the top end 606 of the probe body 605. As the firing shaft 620 moves upward within the probe body 605, the biased trigger pin 735 may extend into the trigger slot 630 at the top end 621 of the firing shaft 620, which holds the firing shaft 620 in a cocked configuration with the firing shaft 620 biased toward the bottom end 606 of the charge probe 350.

To fire the cocked charge probe 350, a user can actuate the trigger 715 via the trigger arm 720, which pulls the trigger pin 735 out of the trigger slot 630 and allows the biased firing shaft to spring downward toward the bottom end 606 of the charge probe 350. The firing pin 635 strikes and discharges the cartridge 740.

In various embodiments, the cartridge 740 may be a standard shotgun shell of 4-gauge, 8-gauge, 10-gauge, 12-gauge, 16-gauge, 20-gauge, 28-gauge, or the like. Such a cartridge 740 may comprise a black powder charge of any suitable size, with a projectile such as buck shot, bird shot, or the like being absent from the cartridge 740. The charge tip 360 may be configured to hold one or more standard cartridge 740, or may be configured (via a sleeve or the like) to accommodate various standard sizes of cartridge 740. In various embodiments, there may be a set of interchangeable charge tips 360 that are each configured to hold a suitable size of cartridge 740. Although various embodiments include standardized shotgun shell cartridges 740, further embodiments may include any suitable cartridge 740 operable to discharge any suitable explosive charge.

In various embodiments, a sensing array 140 and detection system 100 (e.g., FIGS. 1-5) may be used to detect and visualize features that are present with the ground 205 at various depths. For example, as depicted in FIGS. 3a and 3b, there may be ground 205 of a first type and a feature 330 of a second type disposed within the ground 205 at a depth. The feature 340 may have an outer edge 340 that faces the ground 205. A feature 330 may include water, petroleum, a hydrocarbon, coal, tar sands, methane, butane, propane, or the like. In some embodiments, a feature 330 may include a pocket of resistive fluid disposed in the ground 205. A sensing array 140 and detection system 100 may be used to detect desired features 330 at various depths, which may include shallow or deep features 330. In accordance with various embodiments, the present system 100 may be used to detect features 330 at a depth that is substantially deeper than detection capable with currently available detection systems.

Figure 8:
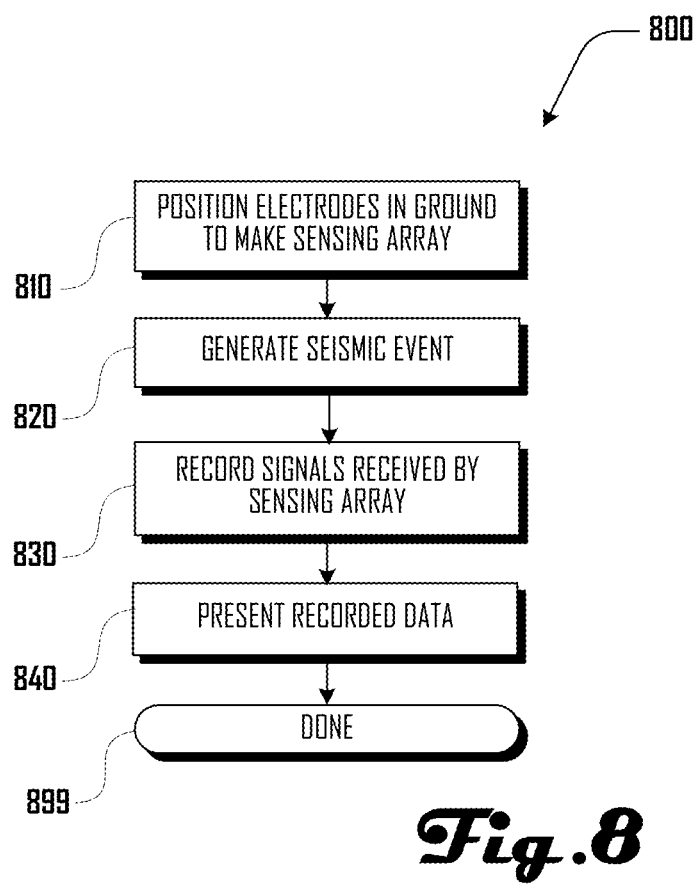
FIG. 8 is an exemplary block diagram of a method for feature detection in accordance with an embodiment.

FIG. 8 is an exemplary block diagram of a method 800 for feature detection in accordance with an embodiment. The method 800 begins, in block 810, where a plurality of electrodes 130 are positioned in the ground 205 and a seismic event is generated, in block 820.

The seismic event generates a sound wave or pulse that propagates in all directions from the source including downward from the source. The pulse propagates through the ground 205 and into features 330 that are present in the ground 205. In various embodiments, ions in the feature 330 at the boundary 340 between the feature 330 and the ground 205 decouple from ion pairs in the ground 205 at the boundary 340. This ion decoupling generates an electrical signal that propagates upward toward the sensing array 140 at about the speed of light.

Depth of the feature boundary is therefore correlated to the propagation time of the seismic pulse through the ground medium and the propagation time of the ion decoupling signal upward to the sensing array 140. Returning to the method 800, such signals received by the sensing array 140 are recorded, in block 830, and the recorded data is presented, in block 840. The method 800 is done in block 899. The form of the signals plotted over time indicates the nature of various features 330 present at various depths in the ground 205. Such sensing can be used to detect desirable features 330 such as water, hydrocarbon, or petroleum deposits, at both deep and shallow depths.

Conventional systems have been unable to perform deep sensing of desirable features because they are unable to observe a signal above environmental signal noise at deep levels. In other words, the signal-to-noise ratio at deep levels was too low to identify features with a suitable level of confidence. Because electrical signals associated with ion decoupling are attenuated as they propagate through a ground medium, signals generated at deep levels can be very weak by the time they reach a sensing array 140.

Given that conventional systems are unable to provide an adequate signal-to-noise ratio, they do not record signals received during a time that corresponded to deep levels (i.e., the recording or timing cutoff is too short to detect signals from deep sources). Additionally, because conventional systems are unable to provide an adequate signal-to-noise ratio, they are not configured to operate at a gain sufficient to detect weak signals that have been substantially attenuated by traveling through a large distance of ground and feature substrate (i.e., signals from a deep source).

However, by positioning and arranging a sensing array 140 in certain novel ways, according to specific novel protocols, and generating a seismic event in certain novel ways and according to specific novel protocols, embodiments disclosed herein are operable to the novel and unexpected result of generating signal-to-noise ratios that provide for detecting and identifying desirable features at depths that are substantially greater than conventional systems. For example, the present system 100 may be configured to sense features 330 at a depth greater than 80 meters, 100 meters, 150 meters, 200 meters, 500 meters, 1000 meters, 1500 meters, 2000 meters, 2500 meters, 3000 meters or the like. The inventor(s) of the disclosed systems and methods discovered such novel and unexpected results after extensive testing and experimentation.

For example, in some embodiments, it is desirable to generate a sensing array 140 with four substantially straight electrodes 130 that are driven into the ground such that the electrodes 130 substantially do not generate a cavity surrounding the electrode 130. This may be desirable because additional contact between the ground 205 and surface of the electrode 130 allows for increased sensitivity of the sensing array 140 to ion decoupling signals. Accordingly, weaker signals may be detected with a signal array 140 constructed in such a way compared to conventional systems.

The conventional method for driving elongated rods into the ground is by hammering the rod with a sledgehammer. Unfortunately, driving a rod into the ground with a sledgehammer, or the like, causes lateral movement of the rod while driving, which forms a cavity in the ground surrounding the driven rod. Accordingly, when driving an electrode 130 into the ground, in various embodiments it may be desirable to drive the electrode 130 via a piston or reciprocating driver that focuses energy downward on the electrode 130 to prevent lateral movement of electrodes 130 while driving that generates a cavity around the electrodes 130 of a sensing array 140. Conventional systems and methods do not rigorously require, suggest or disclose such a protocol of electrode 130 driving.

In some embodiments, consistent orientation, position, depth and structure of the electrodes 130 of a sensing array 140 may provide for improved sensing of the sensing array 140. For example, in various embodiments, it may be desirable for all electrodes 130 to be substantially identical in length, diameter, and composition. In further embodiments, it may be desirable for all electrodes to be oriented substantially perpendicular to the surface of the ground, gravitational axis of the earth or otherwise oriented in substantially the same way. In some embodiments, it may be desirable for electrode pairs 232, 234 to both be at substantially the same distance from the seismic event source location 210 and driven to substantially the same depth. Conventional systems and methods do not rigorously require, suggest or disclose such protocols of electrode 130 positioning, depth and structure.

In further embodiments, it may be desirable to eliminate or neutralize background noise signals so as to increase the signal-to-noise ratio such that weak signals from deep sources can be detected. In some embodiments, it may be desirable to reduce or eliminate metal-to-metal contacts proximate to the time when a seismic event is generated and while signals from features 330 in the ground 205 are being received by the sensing array 140. For example, when using a mallet 420 and plate 310 to generate a seismic event (e.g., FIG. 4), it may be desirable to use a non-metallic mallet 420 head and a non-metallic plate 310. Similarly, it may be desirable to use a timing trigger 150 that does not include a metal-to-metal trigger mechanism, which may include a magnetic trigger mechanism. In some embodiments, it may be desirable to insulate, isolate or cover portions of the charge probe 350. Conventional systems and methods to not provide for, teach or suggest the minimization or exclusion of metal-to-metal contacts during use of the sensing system.

In various embodiments, generating a seismic event with certain systems, charges or methods may provide for an improved signal-to-noise ratio that allows weak deep-source signals to be observed and identified. For example, after extensive experimentation with various types of explosive charges the inventor(s) of the systems and methods disclosed herein discovered the unexpected result of a black powder charge generating a seismic event providing a substantially improved signal-to-noise ratio that allows for detection of deep-source feature detection. Additionally, after extensive experimentation with various types seismic event generation systems, the inventor(s) of the systems and methods disclosed herein discovered the unexpected result of a below-ground explosive black powder charge using a charge probe 350 as described herein providing a substantially improved signal-to-noise ratio that allows for deep-source feature detection. Conventional systems fail to teach or suggest, and fail to recognize, the unexpected results of the improved seismic event generating systems and methods described herein.

Figure 9:
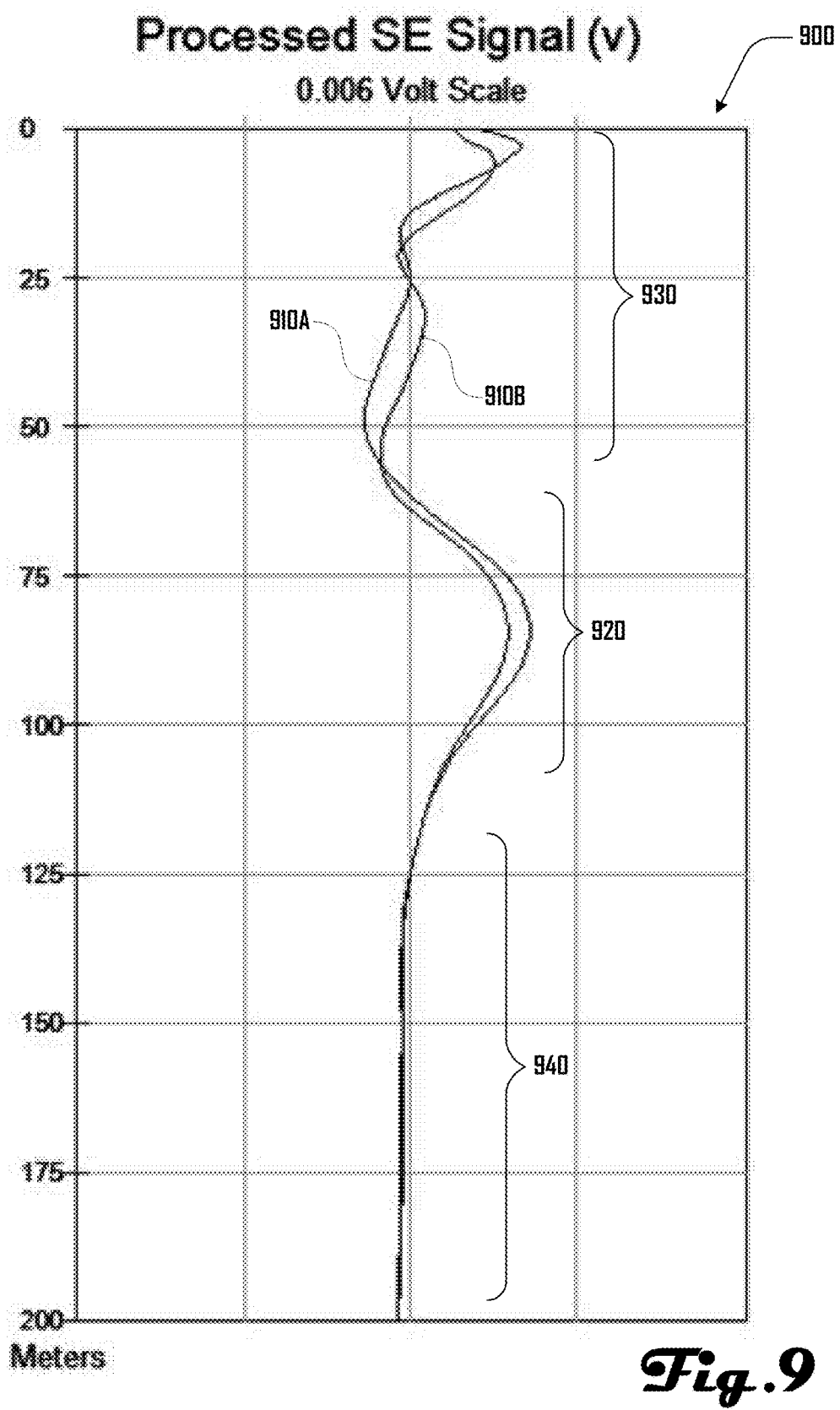
FIG. 9 is an exemplary graph of data obtained from a sensing array.

Signals received by a sensing array 140 may be recorded, stored and visualized via user device 120 to provide for the identification of features 330 in the ground 205 at a testing site, and to determine the depth of identified features 330 (FIGS. 3a and 3b). As discussed herein, in some embodiments, a signal may be obtained from two pairs of electrodes 130 in a sensing array 140 having four electrodes 130A, 130B, 130C, 130D. For example, referring to FIGS. 3a and 3b, one signal data set may be obtained from electrodes 130A and 130B, and a second data set may be obtained from electrodes 130C and 130D. FIG. 9 is an exemplary graph 900 of data obtained from a sensing array 140 in accordance with an embodiment. The graph 900 includes a first and second curve 910A, 910B that in some embodiments is derived from signals received from respective pairs of electrodes 130 in a sensing array 140. The graph 900 is plotted with distance (meters) in the Y-axis against voltage or signal strength in the X-axis.

As discussed herein, data may be received in terms of time and signal strength and time may be converted to distance based on a calculation of propagation time/speed of a seismic pulse in a given medium and propagation time/speed of signals from a transmission source in the ground. Propagation time of a seismic pulse within various ground mediums may vary, and in some embodiments, it may be desirable to plot data in terms of depth based on the propagation speed of a seismic pulse within an identified ground medium. For example, a seismic pulse may travel substantially faster in a dense ground medium such as granite compared to less dense ground mediums such as sandstone. Accordingly, when plotting received data, a different constant may be used when sensing occurs in granite or sandstone. Such constants may be present in ground medium profiles available in a data visualization interface present on user device 120. A ground medium profile may include constants corresponding to one or more ground medium (e.g., profiles corresponding to layered or non-layered ground).

As depicted in FIG. 9, a first and second data set are plotted as a first and second curve 910A, 910B, which may exhibit a similar profile. (As shown and discussed herein, such curves may be more or less corresponding in some embodiments and in some data sets). The profile of various portions of the curves may be indicative of desired features 330 in the ground 205; may be indicative of the ground 205; may be indicative of undesirable features 330; or may be indicative of noise or outlier data. For example, in some embodiments, pockets of resistive fluids may be indicated by a substantially symmetrical Gaussian-like or Lorenzian-like curve profile portion that is substantially matching in both curves 910A, 910B as depicted in curve portion 920. Such a portion may be indicative of a desirable resistive fluid pocket present at approximately 85 meters (i.e., the peak of the Gaussian-like or Lorenzian-like curve profile portion).

The data 910A, 910B may also include asymmetrical and non-uniform portions such as portion 930, which may be indicative of a signal, but not a signal profile associated with a desired feature 330. Such a portion of a set of data 910A, 910B may therefore be indicative of ground 205 or other undesiredable ground feature 330. Similarly, the data 910A, 910B may also include symmetrical and linear portions such as portion 940, which is also indicative of ground 205 or other undesiredable ground feature 330.

Figure 10A:
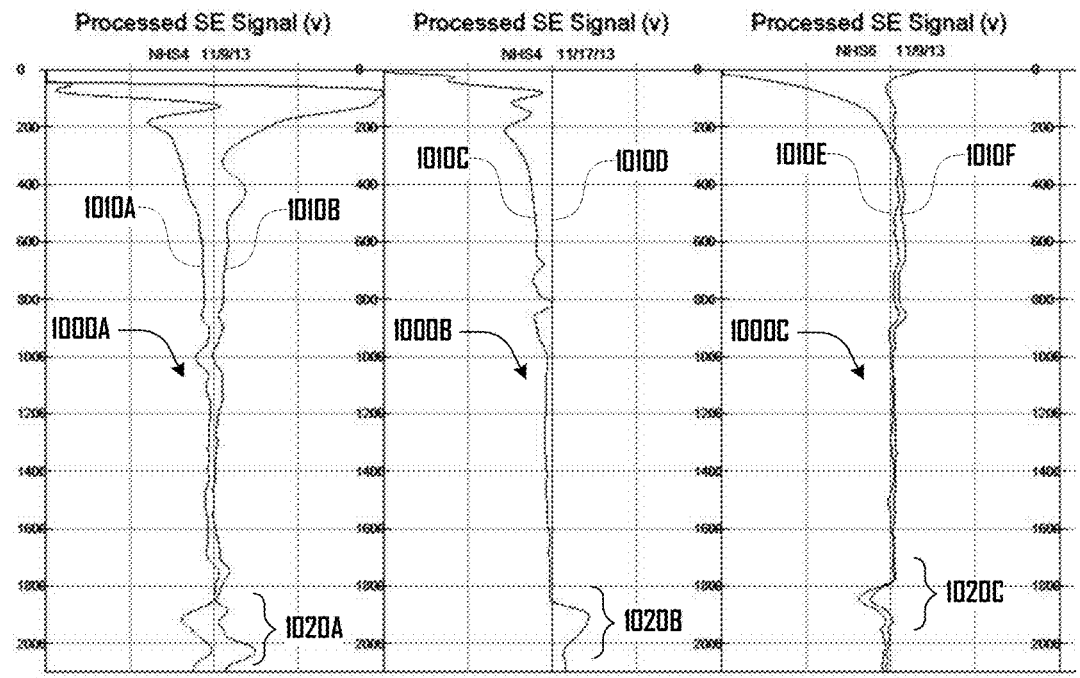
FIGS. 10a and 10b are exemplary graphs of data obtained from a sensing array.
Figure 10B:
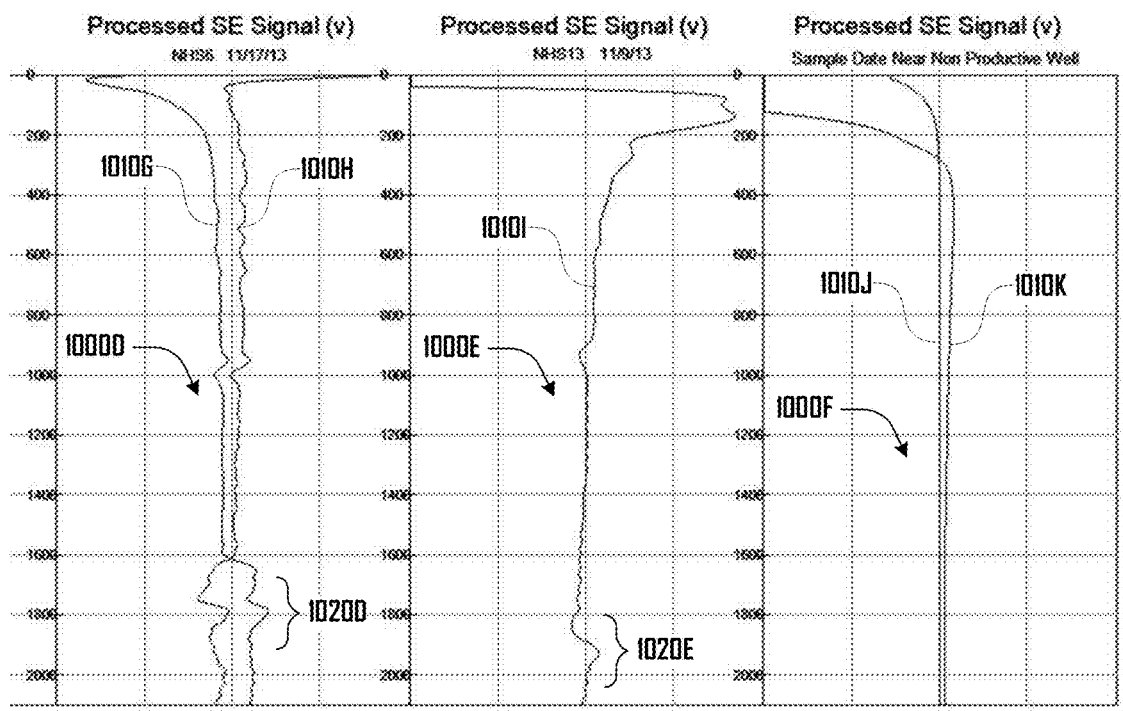

The systems and methods described herein provide the unexpected result of being capable of consistently generating reproducible data that reliably indicates the location and depth of desirable features 330 such as water, petroleum and hydrocarbon deposits. The systems and methods disclosed herein provide such results where others in the art have failed in terms of depth and consistency of results. FIGS. 10a and 10b are an exemplary set of data plots 1000A-F that depict consistency and reliability of data at depths substantially greater than conventional systems.

For example, plots 1000A and 1000B depict data obtained at a known productive well site (NHS4) where the data was obtained on two different days (Nov. 9, 2013 and Nov. 17, 2013) with sensing arrays 140 placed and removed on both days. The data plots 1010A, 1010B, 1010C show a desirable feature profiles 1020A, 1020B between 1800 and 2000 meters at site NHS4 on both days and with both sensing arrays 140. A well was known to be located at site NHS4 at a depth of approximately 1800-2000 meters. (Data plot 1010D indicates that no data was received from the set of electrodes—likely due to a disconnected wire).

In another example, plots 1000C and 1000D depict data obtained at a known productive well site (NHS6) where the data was obtained on two different days (Nov. 9, 2013 and Nov. 17, 2013) with sensing arrays 140 placed and removed on both days. The data plots 1010E, 1010F, 1010G, 1010H show desirable feature profiles 1020C, 1020D at approximately 1800 meters at site NHS6 on both days and with both sensing arrays 140. A well was known to be located at site NHS6 at a depth of approximately 1800 meters. Plot 1000E with data set 1010I depicts a desirable feature profile 1020E identified at a third site NHS13 at approximately 1900 meters. A well was known to be located at site NHS13 at a depth of approximately 1900 meters.

Plot 1000F depicts data sets 1010J and 1010K obtained at a drilling site where no productive well was present. The data sets 1010J and 1010K fail to show a feature profile that is indicative of a desirable feature being present at the site.

Figure 11:
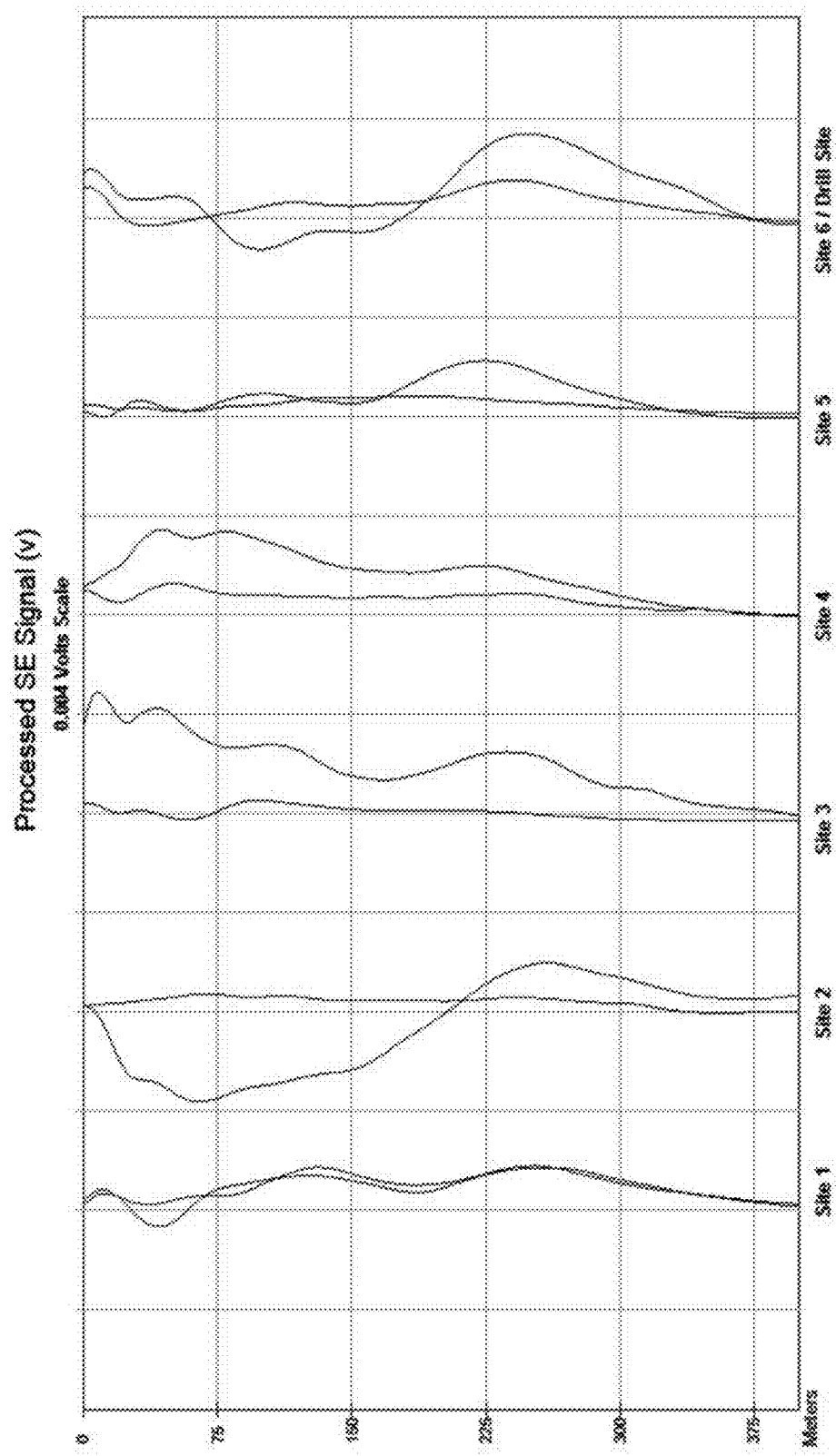
FIG. 11 is another exemplary graph of data obtained from a sensing array.
Figure 12:
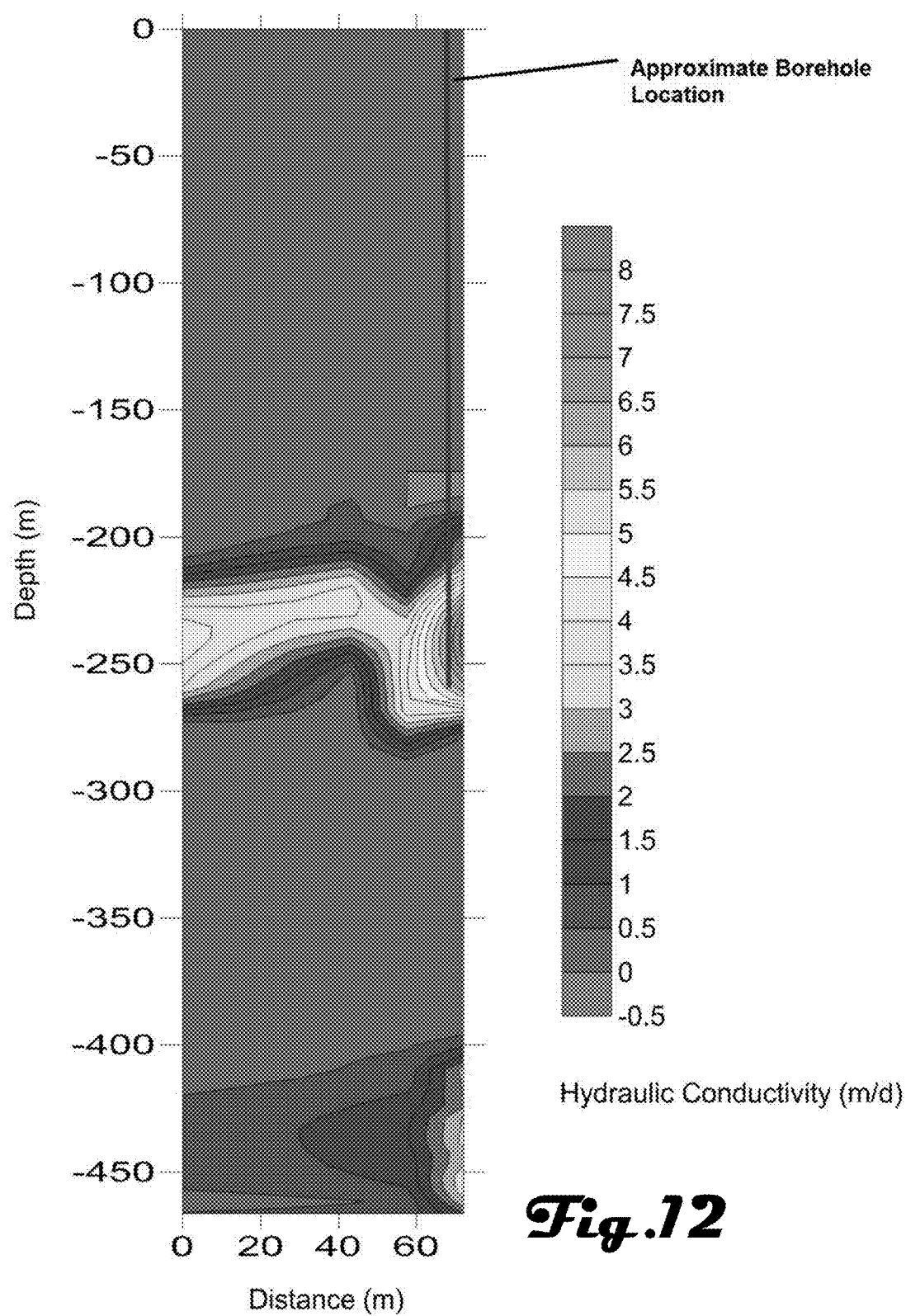
FIG. 12 is an exemplary two-dimensional feature profile graph generated with the data depicted in FIG. 11.

In addition to providing information about desirable features 330 at a single test location, data obtained from a sensing array 140 or sensing system 100 may be used to visualize a two-dimensional contour and depth profile of desirable features 330 present in the ground. In various embodiments, by obtaining data from a plurality of test sites at known distances, a map of desirable features may be generated. FIG. 11 is an exemplary graph of data obtained from a sensing array 140 at six test sites that were 20 meters apart. FIG. 12 is an exemplary two dimensional feature profile graph generated with the data depicted in FIG. 11, wherein the profile of a desirable feature is indicated at a depth of approximately 250 meters.

The described embodiments are susceptible to various modifications and alternative forms, and specific examples thereof have been shown by way of example in the drawings and are herein described in detail. It should be understood, however, that the described embodiments are not to be limited to the particular forms or methods disclosed, but to the contrary, the present disclosure is to cover all modifications, equivalents, and alternatives.

What is claimed is:

1. A method for deep detection of petroleum and hydrocarbon deposits comprising:
    inserting one or more elongated electrodes into the ground at a testing site to generate a sensing array;
    inserting a portion of a collapsible charge probe into the ground at the testing site, the collapsible charge probe including:
        an elongated probe body having a probe top and bottom end and configured to be disassembled into a plurality of pieces, the top end extending from the ground and the bottom end disposed within the ground;
        a first and second handle extending from the probe body at the probe body top end;
        a trigger assembly at the probe body top end and disposed above the ground;
        a removable charge tip disposed at the probe body bottom end holding an explosive charge cartridge, the charge tip disposed within the ground; and
        an elongated firing shaft disposed within the probe body having a shaft top and bottom end and having a firing pin disposed at the shaft bottom end, the firing shaft being biased toward the shaft bottom end and configured to discharge the explosive charge cartridge held in the charge tip by actuation of the trigger assembly, the firing shaft further being configured to be disassembled into a plurality of pieces;

discharging, via the firing pin, the explosive charge cartridge held in the charge tip to generate a percussive seismic event proximate to the sensing array at a below-ground percussive seismic event location, the discharging being triggered by actuating the trigger assembly; and recording sensing signals received by the sensing array, the sensing signals emitted from one or more sources in response to the percussive seismic event.

2. The method of claim 1, wherein the trigger assembly comprises a trigger having a trigger arm, the trigger movably residing in a trigger orifice at the top end of the probe body, with a trigger bolt extending through the trigger and into the trigger orifice where a trigger tip at an end of the trigger bolt is configured to engage with the firing shaft at a firing shaft top end.

3. The method of claim 2, wherein the trigger bolt is inwardly biased toward the firing shaft, with the trigger operable to pull the trigger bolt outward.

4. The method of claim 2, wherein actuating the trigger assembly comprises actuating the trigger via the trigger arm to allow the biased firing shaft to spring downward toward the bottom end of the charge probe where the firing pin strikes and discharges the explosive charge cartridge.

5. The method of claim 1, further comprising loading the charge tip at the testing site by inserting the explosive charge cartridge into the charge tip at the testing site and coupling the charge tip having the explosive charge cartridge with the probe body bottom end.

6. The method of claim 1, wherein the seismic event is triggered by a black powder charge.

7. The method of claim 1, wherein the explosive charge cartridge comprises a shotgun shell.

8. A collapsible charge probe comprising:

an elongated probe body having a probe top and bottom end and configured to be disassembled into a plurality of pieces;

a first and second handle extending from the probe body at the probe body top end;

a trigger assembly at the probe body top end;

a removable charge tip disposed at the probe body bottom end holding an explosive charge cartridge; and an elongated firing shaft disposed within the probe body having a shaft top and bottom end and having a firing pin disposed at the shaft bottom end, the firing shaft being biased toward the shaft bottom end and configured to discharge the explosive charge cartridge held in the charge tip by actuation of the trigger assembly, the firing shaft further being configured to be disassembled into a plurality of pieces.

9. The collapsible charge probe of claim 8, wherein the trigger assembly comprises a trigger having a trigger arm, the trigger movably residing in a trigger orifice at the top end of the probe body, with a trigger bolt extending through the trigger and into the trigger orifice where a trigger tip at an end of the trigger bolt is configured to engage with the firing shaft at a firing shaft top end.

10. The collapsible charge probe of claim 9, wherein actuating the trigger assembly comprises actuating the trigger via the trigger arm, to allow the biased firing shaft to spring downward toward the bottom end of the charge probe where the firing pin strikes and discharges the explosive charge cartridge.

11. The collapsible charge probe of claim 8, wherein the explosive charge cartridge comprises a black powder charge.

12. A charge probe comprising:

an elongated probe body having a probe top and bottom end;

a trigger assembly at the probe body top end;

a charge tip disposed at the probe body bottom end configured for holding an explosive charge cartridge; and an elongated firing shaft disposed within the probe body having a shaft top and bottom end and having a firing pin disposed at the shaft bottom end, the firing shaft being biased toward the shaft bottom end and configured to discharge the explosive charge cartridge held in the charge tip by actuation of the trigger assembly.

13. The charge probe of claim 12, wherein the probe body is configured to be disassembled into a plurality of pieces.

14. The charge probe of claim 12, wherein the firing shaft is configured to be disassembled into a plurality of pieces.

15. The charge probe of claim 12, further comprising at least one handle extending from the probe body at the probe body top end.

16. The charge probe of claim 12, wherein actuating the trigger assembly is configured to discharge an explosive charge cartridge held in the charge tip by actuation of the trigger assembly.

17. The charge probe of claim 12, wherein the trigger assembly comprises a trigger movably residing in a trigger orifice at the top end of the probe body.

18. The charge probe of claim 17 further comprising a trigger bolt extending through the trigger where a trigger tip at an end of the trigger bolt is configured to engage with the firing shaft at a firing shaft top end.

19. The charge probe of claim 18, wherein the trigger bolt is inwardly biased toward the firing shaft, with the trigger operable to pull the trigger bolt outward.

* * * * *